US010069400B1

United States Patent
Morgan, Jr. et al.

(10) Patent No.: US 10,069,400 B1
(45) Date of Patent: Sep. 4, 2018

(54) COMMON-MODE CURRENT CANCELLATION WITH SWITCHING WAVEFORMS FROM ISOLATED APPLICATIONS USING A VARIABLE CAPACITOR NETWORK

(71) Applicant: NATIONAL INSTRUMENTS CORPORATION, Austin, TX (US)

(72) Inventors: Larry D. Morgan, Jr., Leander, TX (US); Raymundo J. Medina, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 0 days.

(21) Appl. No.: 15/827,588

(22) Filed: Nov. 30, 2017

(51) Int. Cl.
*H02J 1/02* (2006.01)
*H02M 1/12* (2006.01)
*H02M 1/14* (2006.01)
*H02M 1/00* (2006.01)
*H02M 7/538* (2007.01)
*H02M 1/44* (2007.01)
*H02M 3/337* (2006.01)
*H02M 3/07* (2006.01)

(52) U.S. Cl.
CPC ............. *H02M 1/12* (2013.01); *H02M 1/44* (2013.01); *H02M 3/3376* (2013.01); *H02M 2001/123* (2013.01); *H02M 2003/078* (2013.01)

(58) Field of Classification Search
CPC .... H02M 2001/0019; H02M 2001/123; H01F 27/42; H01F 27/422

USPC ....... 323/355–358; 363/39–43, 78, 131, 133, 363/134
See application file for complete search history.

(56) References Cited

U.S. PATENT DOCUMENTS

| 4,150,424 | A | * | 4/1979 | Nuechterlein | ...... | H02M 3/3378 |
| | | | | | | 363/134 |
| 5,414,348 | A | * | 5/1995 | Niemann | .................. | G01R 1/30 |
| | | | | | | 324/127 |
| 5,587,692 | A | | 12/1996 | Graham | | |
| 5,606,250 | A | | 2/1997 | Niemann | | |
| 6,765,808 | B1 | * | 7/2004 | Jin | .................... | H02M 3/33523 |
| | | | | | | 363/131 |
| 2004/0027842 | A1 | * | 2/2004 | Tanabe | ................ | H02M 3/3372 |
| | | | | | | 363/133 |

(Continued)

*Primary Examiner* — Gary Nash
(74) *Attorney, Agent, or Firm* — Meyertons Hood Kivlin Kowert & Goetzel, P.C.; Jeffrey C. Hood (57) ABSTRACT

A residual current (e.g. common-mode current) may be present in an isolated subsystem. The isolated subsystem may include the secondary winding of a transformer while a first subsystem may include the primary winding of the transformer. The first subsystem may also include a compensation circuit. A driver circuit may generate drive signals provided to the primary winding of the transformer and also to the compensation circuit. The compensation circuit may include a variable capacitor network (e.g. a variable capacitor diode network) that receives the drive signals and also receives a bias voltage, and generates a cancellation signal according to the drive signals and the bias voltage. The compensation circuit may provide the cancellation signal to the ground plane of the isolated subsystem through a capacitor that couples the variable capacitor diode network to the ground plane, in order to reduce or cancel the residual current present in the isolation subsystem.

20 Claims, 7 Drawing Sheets

(56) References Cited

U.S. PATENT DOCUMENTS

2007/0091648 A1\* 4/2007 Johnston ................. H02M 1/14
 363/16
2008/0068085 A1 3/2008 Chiu
2014/0334195 A1\* 11/2014 Nussbaum .......... H02M 3/3376
 363/21.04

\* cited by examiner

COMMON-MODE CURRENT CANCELLATION WITH SWITCHING WAVEFORMS FROM ISOLATED APPLICATIONS USING A VARIABLE CAPACITOR NETWORK

BACKGROUND

Field of the Invention

This invention relates to noise cancellation techniques and, more particularly, to common-mode current cancellation techniques for isolated applications.

Description of the Related Art

A push-pull DC-DC converter may be used to generate isolated power supplies in a system including a non-isolated subsystem and an isolated subsystem. The transformer of the DC-DC converter may provide the power necessary for operation of the circuitry in the isolation subsystem. In addition, the transformer may provide isolation between the non-isolated subsystem and the isolated subsystem by blocking DC signals.

A typical problem with systems implementing isolation applications is the common-mode current that flows from the non-isolated primary to the isolated secondary through the parasitic capacitance inside the transformer. The common-mode current may interfere with the signals in the I/O channel of the isolated subsystem and may potentially cause interference in a customer's circuit or system that is connected to the isolated subsystem. One method to minimize the common-mode current is to place a grounded shield between the primary and secondary of the transformer. However, the grounded shield usually increases the transformer size, cost, and complexity.

Another technique to minimize the common-node current is to inject a compensation current of the opposite phase into the isolated ground by using a potentiometer and a resistor-capacitor (RC) network. This solution may apply a scaled version of the primary waveform to a capacitor connected to the isolated ground plane. The potentiometer may be used to weight one side of the primary more than the other. However, the potentiometer solution typically increases the parts count and cost of the system.

SUMMARY

Various embodiments are disclosed of a mechanism for reducing common-mode current in a system including a first subsystem and an isolated subsystem. Furthermore, various embodiments are disclosed for reducing a residual current that may be present in a secondary winding of a transformer as a result of a parasitic capacitance mismatch between the primary winding of the transformer and the secondary winding of the transformer. The transformer may act as an isolation mechanism that isolates the isolated subsystem from the first subsystem by blocking DC signals, and the isolated subsystem may receive the common-mode current from the first subsystem via the isolation mechanism.

In some embodiments, a first subsystem may include a driver circuit that generates and provides drive signals to an isolation mechanism. The first subsystem may also include a compensation circuit that receives the drive signals and generates a compensation signal according to at least the drive signals. Finally, the first subsystem may include an isolated subsystem coupled to the first subsystem via the isolation mechanism, with the isolation mechanism blocking DC signals from being received at the isolated subsystem. The isolated subsystem may receive a common-mode current from the first subsystem via the isolation mechanism, and the compensation circuitry may provide the compensation signal to a ground plane of the isolated subsystem to reduce or eliminate the common-mode current received at the isolated subsystem.

The compensation circuitry may include a variable capacitor diode network that receives the drive signals, and may further include a biasing element that provides a direct-current (DC) bias voltage to the variable capacitor diode network. The biasing element may be a digital-to-analog converter, and the compensation circuit may adjust the amplitude and polarity of the compensation signal according to the DC bias voltage. In some embodiments, the variable capacitor diode network may include variable capacitance diodes and/or or metal-oxide semiconductor field effect transistor body diodes.

In some embodiments, an isolated power supply may include a transformer having a primary winding that receives an input voltage, and may also include a secondary winding that provides an output voltage based on the input voltage. The power supply may also include a driver circuit that provides drive signals to the primary winding of the transformer to control the output voltage. The power supply may further include a compensation circuit that receives the drive signals from the driver circuit, generates a compensation signal according to at least the received drive signals, and provides the compensation signal to a ground plane coupled to the secondary winding of the transformer to reduce or eliminate a residual current in the secondary winding. The residual current may be caused by a parasitic capacitance mismatch between the primary winding of the transformer and the secondary winding of the transformer. The compensation circuit may include a variable capacitor diode network that receives the drive signals, and may also include a biasing element that provides a bias voltage to the variable capacitor diode network. The compensation circuit may adjust the amplitude and polarity of the compensation signal according to the bias voltage. The variable capacitor diode network may be implemented using variable capacitance diodes or metal-oxide semiconductor field effect transistor body diodes. Furthermore, the compensation circuit may provide the compensation signal to the ground plane through a capacitor that couples the variable capacitor diode network to the ground plane.

In various embodiments, instrumentation systems may be designed to include the first subsystem and isolated subsystem as described above. In further embodiments, instrumentation systems may be designed to include the isolated power supply described above.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Figure 1:
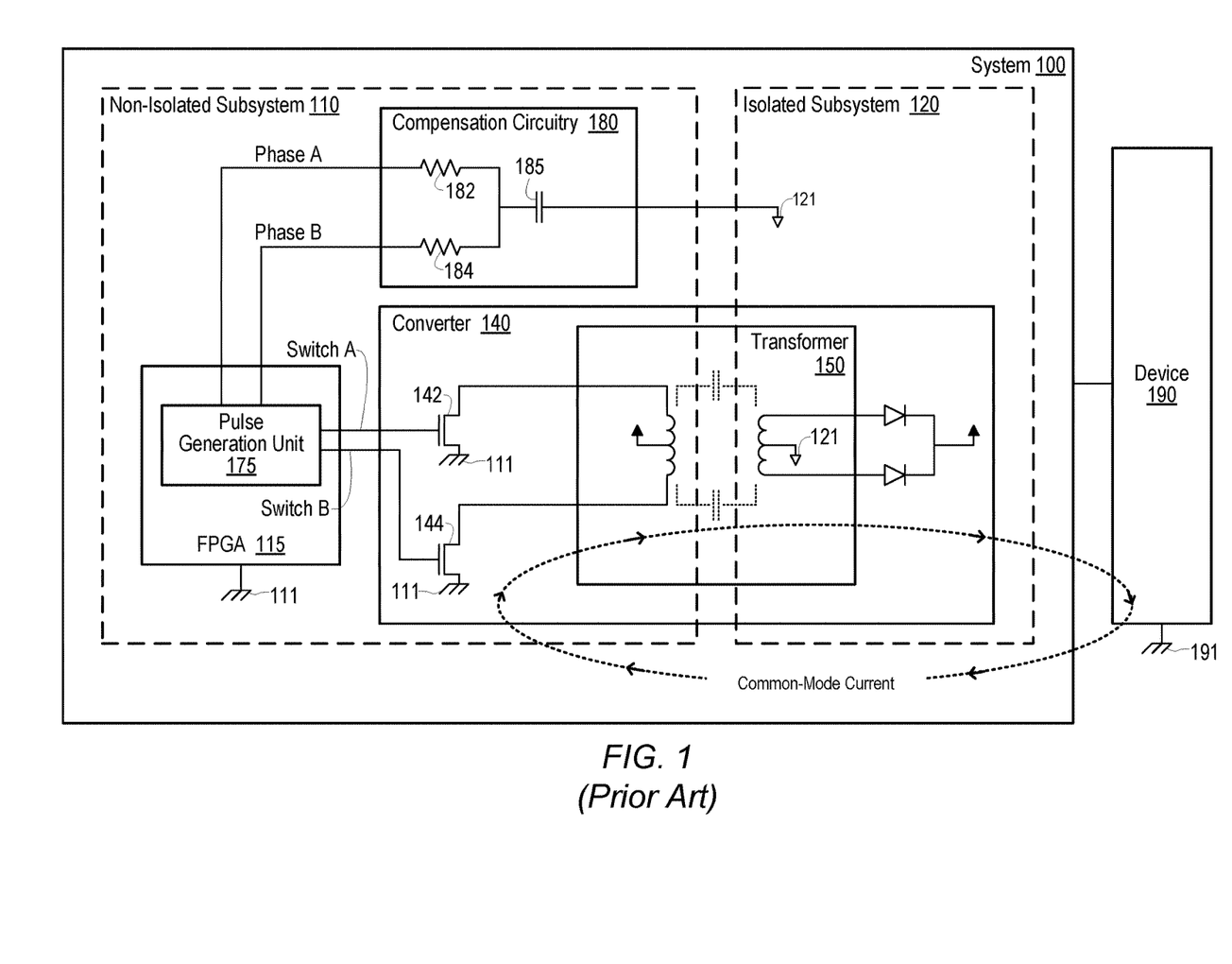
FIG. 1 is a diagram of an exemplary system including a mechanism for reducing common-mode current in an isolated subsystem, according to prior art.

FIG. 1 is a diagram of one embodiment of a prior art system 100 including a mechanism for reducing common-mode current in an isolated subsystem 120. As illustrated, the system 100 includes a non-isolated subsystem 110 and an isolated subsystem 120. During operation, a common-mode current may flow from non-isolated subsystem 110 to isolated subsystem 120. Circuitry within non-isolated subsystem 110 provides a first and a second pulse to a compensation circuit to generate a cancellation signal. The cancellation signal is injected into the isolated ground of the isolated subsystem 120 to reduce the common-mode current received at isolated subsystem 120.

System 100 may be a card or board plugged into one of the I/O slots of a computer system, or a card or board plugged into a chassis. System 100 may also be any of various types of computing or processing systems, including a personal computer system (PC), mainframe computer system, server system including a plurality of server blades, workstation, network appliance, Internet appliance, personal digital assistant (PDA), or other device or combinations of devices. It is noted however that system 100 may be one of many other types of systems or devices including at least one isolated subsystem that receives a common-mode current, e.g., isolated subsystem 120.

The non-isolated subsystem may be formed as shown in FIG. 1. In FIG. 1, the non-isolated subsystem 110 includes a field-programmable gate array (FPGA) 115, compensation circuitry 180, non-isolated ground 111, and a primary section of a converter 140. The primary section of converter 140 includes a primary side of a transformer 150 (i.e., an isolation mechanism), a switch 142 and a switch 144. Converter 140 may be a push-pull DC-DC converter. It is noted, however, that converter 140 may be another type of converter. Compensation circuitry 180 may be configured as an RC network. As illustrated in FIG. 1, compensation circuitry 180 is connected to converter 140 and includes a resistor 182, a resistor 184, and a capacitor 185. Also, FPGA 115 is connected to compensation circuitry 180 and converter 140 and includes a pulse generation unit 175. The pulse generation unit 175 may be implemented in hardware and/or software. Capacitor 185 may be a printed circuit board (PCB) capacitor. A PCB capacitor is a parallel plate capacitor formed on a printed circuit board by overlapping planes from the isolated and non-isolated sides. That is, a PCB capacitor may be constructed using copper planes on the printed circuit board as capacitor plates, and the printed circuit board dielectric as the capacitor dielectric. It is noted, however, that capacitor 185 may be another type of capacitor.

Furthermore, as shown in FIG. 1, the isolated subsystem 120 includes a secondary section of converter 140, which includes a secondary side of transformer 150, and isolated ground 121. The isolated subsystem 120 may be connected to a device 190, e.g., an external unit under test (UUT). The transformer 150 may provide the power supplies necessary to power the isolated subsystem 120. The transformer 150 may also isolate the isolated subsystem 120 from the non-isolated subsystem 110 by blocking DC signals. System 100 may include other types of isolation mechanisms that achieve isolation between the two subsystems by blocking DC signals.

During operation of system 100, a common-mode current may flow from non-isolated subsystem 110 to isolated subsystem 120 through the parasitic capacitance inside transformer 150. The common-mode current may interfere with the operation of the isolated subsystem 120 and/or the device 190. As shown in FIG. 1, pulse generation unit 175 of FPGA 115 provides a phase A and a phase B pulse to compensation circuitry 180 to generate a cancellation signal. The RC network of the compensation circuitry 180 may filter the waveforms to create the desired cancellation signal. The cancellation signal is then injected into the isolated ground 121 of the isolated subsystem 120 to reduce the common-mode current received at isolated subsystem 120. For example, the cancellation signal may cancel a relatively large portion of the received common-mode current.

Figure 2:
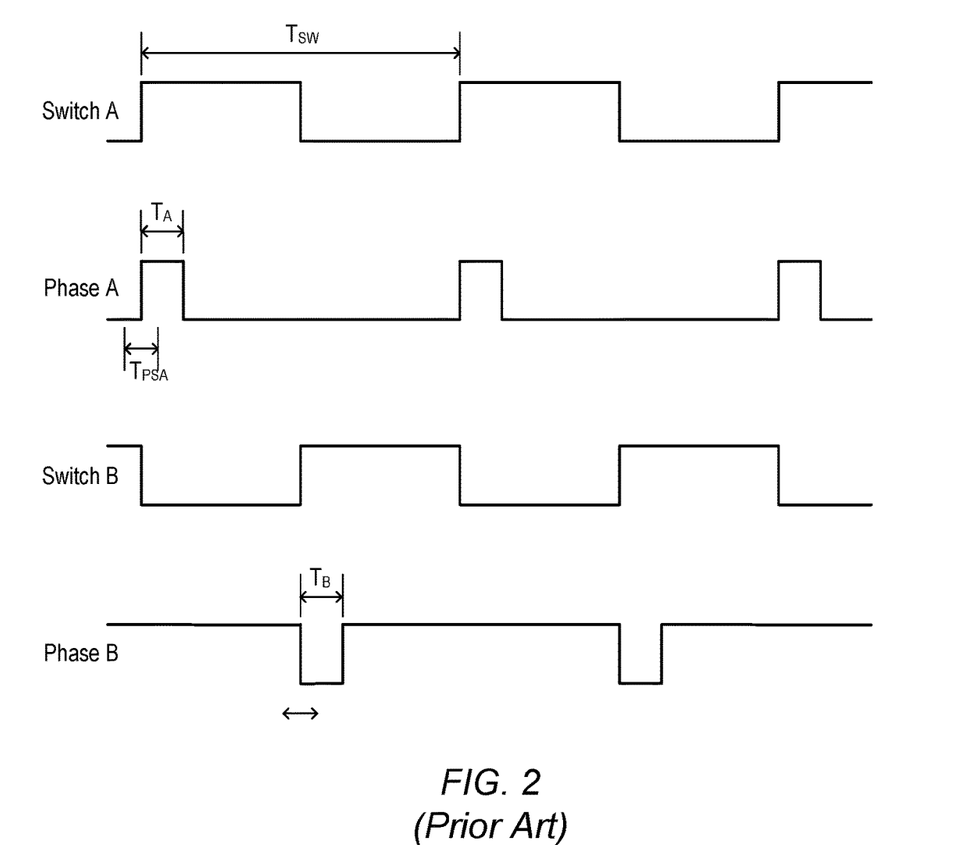
FIG. 2 is an exemplary timing diagram illustrating pulses generated during cancellation operation by the pulse generation unit of FIG. 1, according to some embodiments.

FIG. 2 is a timing diagram of the pulses generated by pulse generation unit 175 during the cancellation operation, according to one mode of operation. Besides the phase A and B pulses, pulse generation unit 175 may also generate a switch A pulse and a switch B pulse. During operation of the transformer 150, the switch A pulse may control when switch 142 of converter 140 changes between on/off states, and the switch B pulse may control when switch 144 of converter 140 changes between on/off states. The switching waveforms (switch A and B pulses) may be 50% duty cycle pulses, 180° out-of-phase, and have a period $T_{SW}$. It is noted, however, that the duty cycle and phase parameters associated with the switching waveforms may vary.

The phase A and B pulses may be variable phase and duty cycle pulses. These compensation waveforms (phase A and B pulses) may be synchronous to the switching waveforms, and the phase and the duty cycle of each phase pulse may be configurable relative to the corresponding switch pulse. As illustrated in FIG. 2, the phase A pulse may have a variable period $T_A$ and a variable phase $T_{PSA}$ relative to the switch A pulse, and the phase B pulse may have a variable period $T_B$ and a variable phase $T_{PSA}$ relative to the switch B pulse. To achieve optimal cancellation results, the phase and duty cycle of the phase A pulse and of the phase B pulse may be varied independently of one another. The phase A and phase B pulses may also be inverted as needed. For example, the phase A pulse shown in FIG. 2 may be inverted so that the falling edge of the phase A pulse may be synchronized with the rising edge of the switch A pulse. Since the pulse generation unit 175 of FPGA 115 may generate both the compensation waveforms and the switching waveforms, the waveforms may be on the same time base. It is noted, however, that in alternate implementations, the compensation and switching waveforms may be generated by different components of the system 100.

Variable duty cycle pulses may be needed to account for both the capacitive imbalance in transformer 150 and the magnitude of the common-mode current received at the isolated subsystem 120. Transformers, even of the same make and model, may each have a unique amount and imbalance of parasitic capacitance due to the manufacturing process. Therefore, during manufacturing, each part may go through a calibration routine and other testing to determine certain characteristics of the transformer, e.g., the amount of imbalance of parasitic capacitance and the magnitude of the common-mode current. During testing, the common-mode current may be measured by connecting a test resistor between the channel terminals of the isolated subsystem 120 and shorting the positive terminal to earth ground 191. This arrangement may force the common-mode current to flow through the test resistor. The voltage across the test resistor may then be measured with an oscilloscope to determine the common-mode current. The capacitive imbalance and the magnitude of the common-mode current may also be measured using other methods.

Based on the imbalance of parasitic capacitance and the magnitude of the common-mode current measured during testing, the duty cycle and phase of the phase A and B pulses may be varied to generate the necessary cancellation signal to reduce the common-mode current received at the isolated subsystem 120. Also, in some embodiments, the phase A pulse and/or the B pulse may be inverted based on the measured characteristics of transformer 150.

The duty cycle of the compensation pulses may be calculated using the equations shown below.

$$\text{phase } A \text{ duty cycle, } dc_A = \frac{T_A}{T_{SW}}$$

$$\text{phase } B \text{ duty cycle, } dc_B = \frac{T_B}{T_{SW}}$$

The current through capacitor C1 may be a linear combination of the phase A and B pulses. If $V_A$ and $V_B$ are voltage sources that represent phase A and phase B, respectively, the transfer function for each phase may be represented by the equations shown below.

$$H_A(s) = \frac{\frac{R2}{s \cdot R2 \cdot C1 + 1}}{R1 + \frac{R2}{s \cdot R2 \cdot C1 + 1}}$$

$$H_B(s) = \frac{\frac{R1}{s \cdot R1 \cdot C1 + 1}}{R2 + \frac{R1}{s \cdot R1 \cdot C1 + 1}}$$

where R1 is resistor 182
R2 is resistor 184
C1 is capacitor 185

The voltage waveforms for phase A and B may be represented by their Fourier series since they are periodic.

$$V_A(t) = c_{A_0} + \sum_{n=1}^{\infty} [2 \cdot \text{Re}(c_{A_n}) \cdot \cos(n \cdot \omega_o \cdot t) - 2 \cdot \text{Im}(c_{A_n}) \cdot \sin(n \cdot \omega_o \cdot t)]$$

where $c_A$ are the Fourier series coefficients for phase A
$\omega_o$ is the frequency ($1/T_{SW}$)

$$c_{A_n} = \frac{1}{T_{SW}} \cdot \int_{-\frac{dc_A \cdot T_{SW}}{2}}^{\frac{dc_A \cdot T_{SW}}{2}} V_{CC} \cdot e^{-j \cdot n \cdot \omega_o \cdot t} \cdot dt$$

$$n \in [0, \infty]$$

where $dc_A$ is the duty cycle of phase A
$V_{CC}$ is the FPGA 115 power supply $$c_{B_n} = \frac{1}{T_{SW}} \cdot \int_{-\frac{(1-dc_B) \cdot T_{SW}}{2}}^{\frac{(1-dc_B) \cdot T_{SW}}{2}} V_{CC} \cdot e^{-j \cdot n \cdot \omega_o \cdot t} \cdot dt$$

$$n \in [0, \infty]$$

where $c_B$ are the Fourier series coefficients for phase B
$dc_B$ is the duty cycle of phase B Based on these calculations, the voltage across capacitor C1 may be derived as follows.

$$V_{C1}(t) = \sum_{n=-\infty}^{\infty} H_A(j \cdot n \cdot \omega_o) \cdot c_{A_n} \cdot e^{j \cdot n \cdot \omega_o \cdot t} + \sum_{n=-\infty}^{\infty} H_B(j \cdot n \cdot \omega_o) \cdot c_{B_n} \cdot e^{j \cdot n \cdot \omega_o \cdot t}$$

where $c_{A_n} = \overline{c_{A_n}}$ for $n < 0$

The current through C1 may then be calculated as shown below.

$$I_{C1}(t) = C1 \cdot \frac{dV_C(t)}{dt}$$

Then, the RMS value of this current may be computed as follows.

$$I_{rms} = \sqrt{\frac{1}{T_{SW}} \cdot \int_0^{T_{SW}} |I_{C1}(t)|^2 dt}$$

Figure 3:
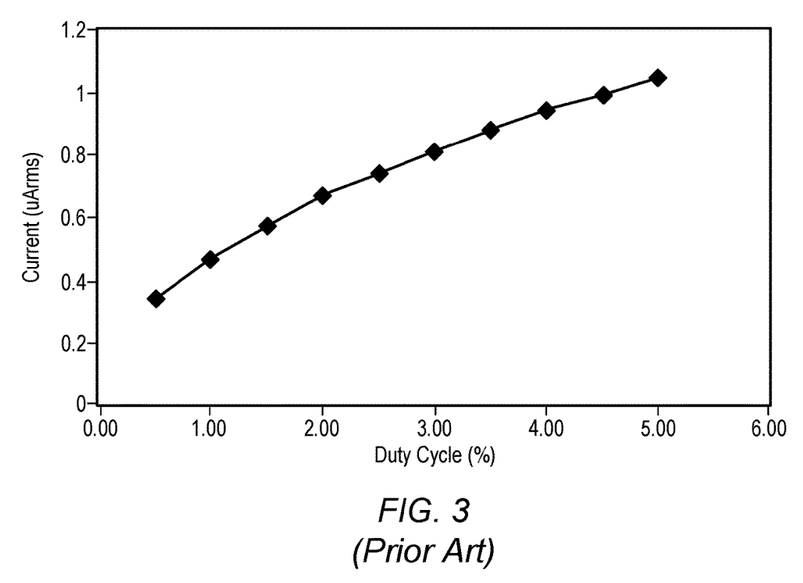
FIG. 3 is an exemplary graph showing the relationship between duty cycle and the current through the capacitor of the compensation circuitry of FIG. 1, according to some embodiments.

As shown in FIG. 3, the magnitude of the current $I_{rms}$ may be a function of the duty cycles of the phase A and B pulses. As the duty cycle is increased, a larger cancellation current may be injected into isolated ground 121 to further reduce the common-mode current received at isolated subsystem 120. It is noted, however, that in some implementations, varying the duty cycle may affect the current differently than the relationship shown in FIG. 3.

Improved Common-Mode Current Cancellation

While compensation circuitry 180 driven with the compensation pulses (or pulse signals) Phase A and Phase B reduces residual current caused by a winding imbalance that may be present in transformer 150, improvements in reducing the residual current are still possible. For example, the compensation pulse signals have slightly different edge rates and phase than the transformer node switch signals (Switch A and Switch B) that are actually driving the transformer. Furthermore, there remains a bandwidth limitation, thus transient spikes are not eliminated, and due to the introduction of the additional signals Phase A and Phase B to drive the compensation circuitry, the transients may in fact be worse than in the absence of the compensation circuitry 180.

Figure 5:
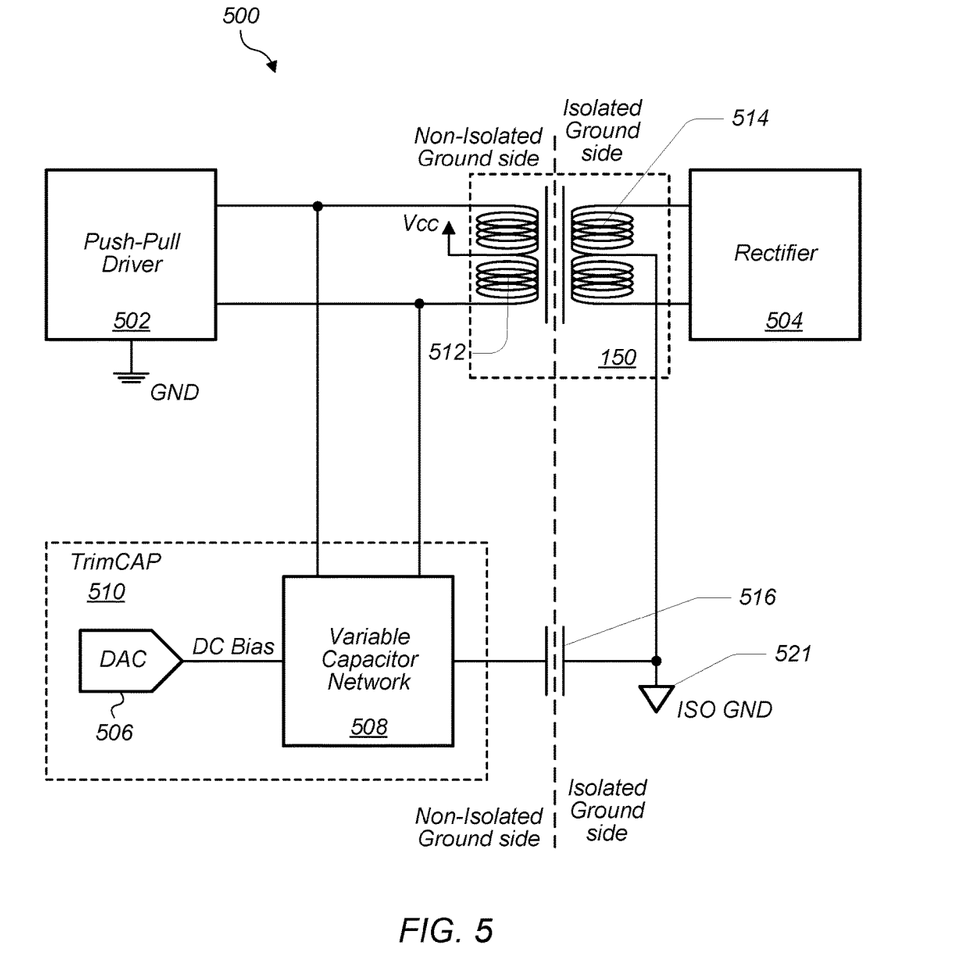
FIG. 5 is a simplified diagram of an isolated power supply that includes an improved mechanism for reducing common-mode current in an isolated subsystem, according to some embodiments.

FIG. 5 shows a simplified circuit diagram of an isolated power supply 500 that includes an improved mechanism for reducing common-mode current in an isolated subsystem, according to some embodiments. Power supply 500 is an isolated power supply with common-mode current compensation achieved through the use of a variable capacitor network 508. The transformer windings (primary winding 512 and secondary winding 514) present a parasitic capacitance to the overall circuit during operation. The leg-to-leg parasitic capacitance mismatch, i.e. the mismatch between the parasitic capacitance presented by primary winding 512 and the parasitic capacitance presented by secondary winding 514, results in a common-mode current injected into isolated ground 521 (flowing into isolated ground 521). To put it another way, since the parasitic capacitance of primary winding 512 may not be identical to the parasitic capacitance of secondary winding 514, a common-mode current may be injected/flowing into the isolated ground 521 during operation of the power supply 500. The injected common-mode current is undesirable as it represents a source of measurement noise on isolated data acquisition devices powered by isolated power supply 500. However, using a variable capacitor network 508, it is possible to inject a corrective common-mode current into isolated ground 521 through a capacitor 516 (e.g. a PCB capacitor) to cancel out the common-mode current resulting from the leg-to-leg parasitic capacitance mismatch.

Variable capacitor network 508 may be included as part of a trim capacitor circuitry 510, which is used to generate the corrective common-mode current. A digital-to-analog converter (DAC) 506 may be used to generate a DC bias for the variable capacitor network 508, which may be driven by the actual power supply driver signals generated by push-pull driver circuit 502. The use of variable capacitor network 508 provides the benefit of no added DC current, low-power operation, and high operating bandwidth. As shown in FIG. 5, the primary winding 512 of transformer 150 is on the non-isolated ground side representative of a first subsystem (or non-isolated subsystem), while the secondary winding 514 of transformer 150 is on the isolated ground side representative of an isolated subsystem, with a rectifier 504 coupled to the terminals of the secondary winding 514. The net effect of providing the DC bias to the variable capacitor network 508 by DAC 506, and driving the variable capacitor network 508 with the driver signals generated by push-pull driver 502 is the reduction or elimination of the residual current caused by (or resulting from) the parasitic capacitance mismatch between primary winding 512 and secondary winding 514.

Figure 6:
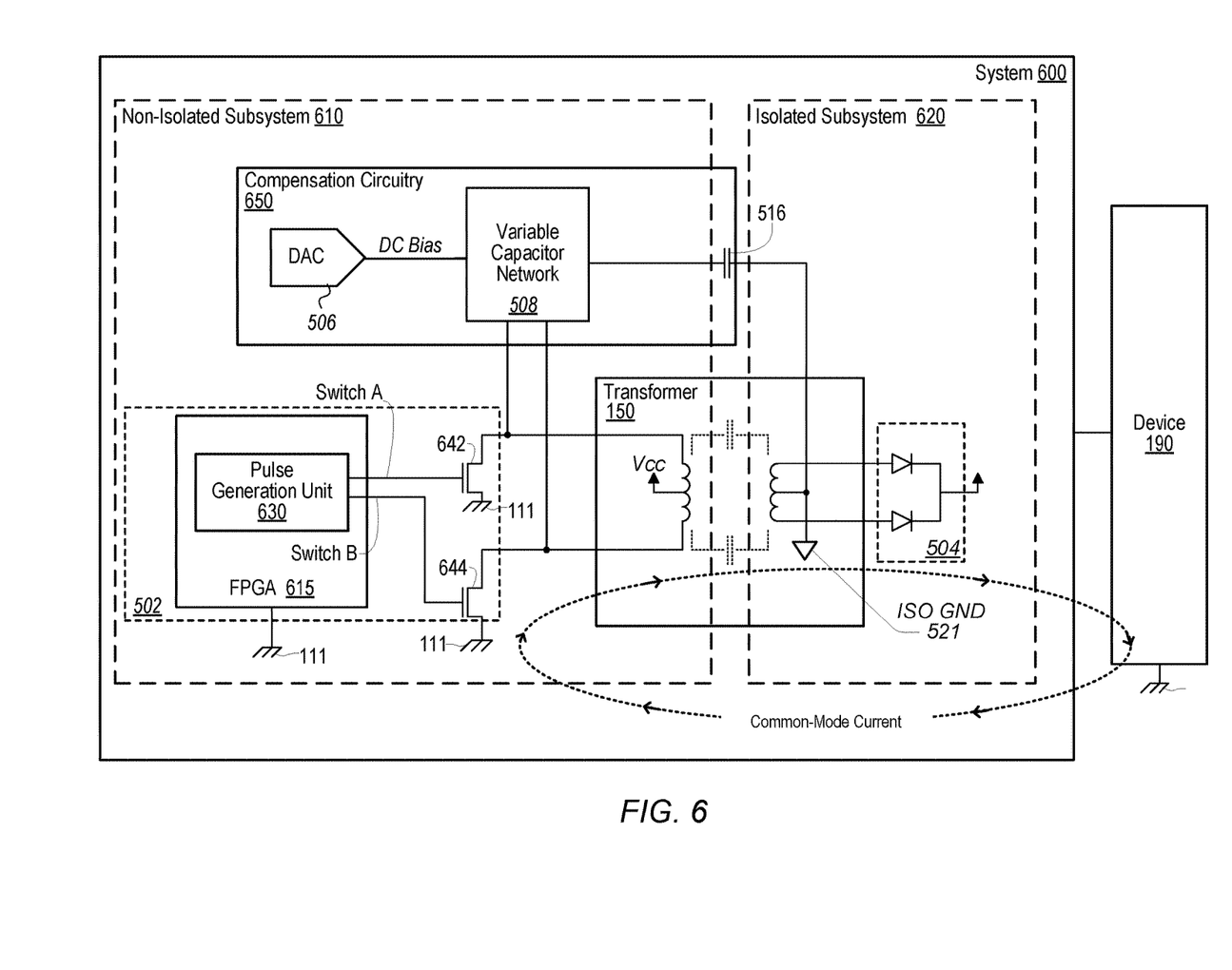
FIG. 6 is a circuit diagram of an exemplary system that includes the power supply of FIG. 5, according to some embodiments.

FIG. 6 is a circuit diagram of an exemplary system 600 that includes a power supply, e.g. power supply 500 of FIG. 5, and also includes an improved mechanism for common-mode current compensation/cancellation. As seen in FIG. 6, system 600 is similar to system 100 of FIG. 1, but with notable and important differences. A non-isolated subsystem 610 may be formed as shown in FIG. 6, and may include push-pull driver 502, compensation circuitry 650, non-isolated ground 111, and a primary winding of transformer 150. Push-pull driver 502 may include a field-programmable gate array (FPGA) 615, and upper-side and lower-side switches 642 and 644, respectively. In some embodiments, as shown in FIG. 6, switches 642 and 644 may be transistors, for example field effect transistors. The primary winding of transformer 150 may be considered part of the isolation mechanism. Transformer 150 may be part of a power supply/converter such as power supply 500 shown in FIG. 5. It is noted, however, that transformer 150 may be part of another type of converter. As illustrated in FIG. 6, compensation circuitry 650 is connected to transformer 150, and may include a trim capacitor circuit, such as trim capacitor circuit 510, with DAC 506 and variable capacitor network 508, and capacitor 516. FPGA 615 is connected to transformer 150 and includes a pulse generation unit 630. The pulse generation unit 630 may be implemented in hardware and/or software. Capacitor 516 may be a PCB capacitor, e.g. a parallel plate capacitor formed on the printed circuit board of the module assembly by overlapping planes from isolated and non-isolated sides. It is noted, however, that capacitor 516 may be another type of capacitor.

As also shown in FIG. 6, the isolated subsystem 610 includes a secondary winding of transformer 150, and isolated ground 521. The isolated subsystem 620 may be connected to a device 190, e.g., an external unit under test (UUT). The transformer 150 may provide the power necessary to power the isolated subsystem 620, and may also isolate the isolated subsystem 620 from the non-isolated subsystem 610 by blocking DC signals. System 600 may include other types of isolation mechanisms that achieve isolation between the two subsystems by blocking DC signals.

During operation of system 600, a common-mode current may flow from non-isolated subsystem 610 to isolated subsystem 620 through the parasitic capacitance inside transformer 150. The common-mode current may interfere with the operation of the isolated subsystem 620 and/or the device 190. As shown in FIG. 6, pulse generation unit 630 of FPGA 615 generate a switch A pulse, and a switch B pulse. During operation of the transformer 150, the switch A pulse may control when switch 642 of the power converter changes between on/off states, and the switch B pulse may control when switch 644 of the power converter changes between on/off states. The switching waveforms (switch A and B pulses) may be 50% duty cycle pulses, 180° out-of-phase, and have a period TSW. It is noted, however, that the duty cycle and phase parameters associated with the switching waveforms may vary. The outputs from switches 642 and 644 represent the drive signals driving the primary winding of transformer 150. The drive signals are also provided to variable capacitor network 508, and the variable capacitor network 508 and capacitor 516 of the compensation circuitry 650 may create the desired cancellation signal based on the drive signals and the DC bias provided by DAC 506. The cancellation signal may then be injected into the isolated ground 521 of the isolated subsystem 620 to reduce or altogether eliminate the common-mode current received at isolated subsystem 620. For example, the cancellation signal may cancel a relatively large portion of the received common-mode current, or it may completely eliminate the received common-mode current.

Figure 7:
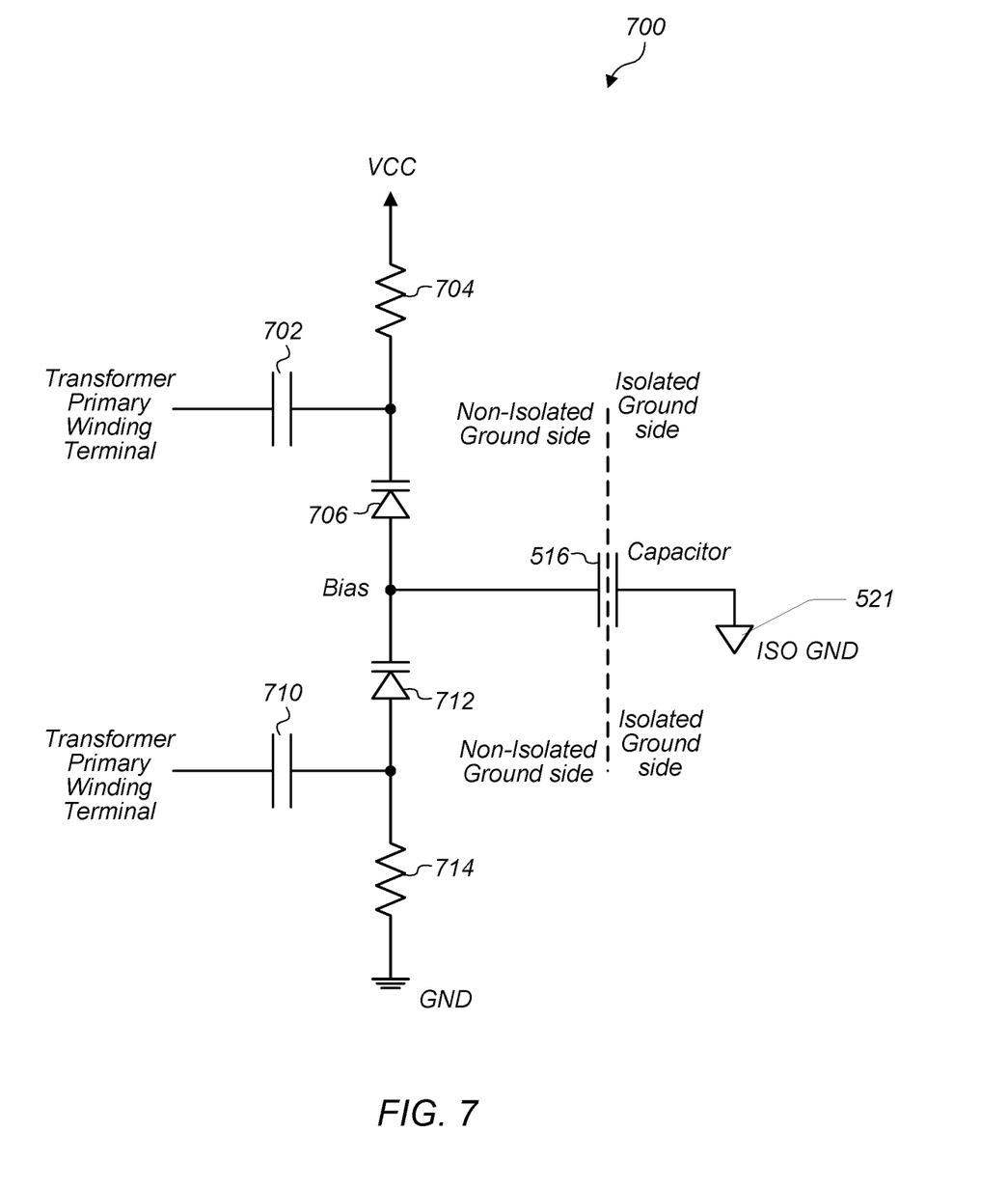
FIG. 7 is a circuit diagram of an exemplary implementation of the variable capacitor network using varicap diodes, according to some embodiments.

FIG. 7 is a circuit diagram of an exemplary implementation 700 of the variable capacitor network using variable capacitance (varicap) diodes, according to some embodiments. As shown in FIG. 7, in some embodiments, variable capacitor network 508 may be implemented using varicap diodes 706 and 712 configured with static capacitors 702 and 710, and resistors 704 and 714. Capacitors 702 and 710 may be used to respectively couple to the two primary legs of the transformer (e.g. transformer 150 in FIG. 6), to be driven by the same drive signals as transformer 150. Thus, the implementation 700 of variable capacitor network 508 may be considered a variable capacitor diode network.

Figure 8:
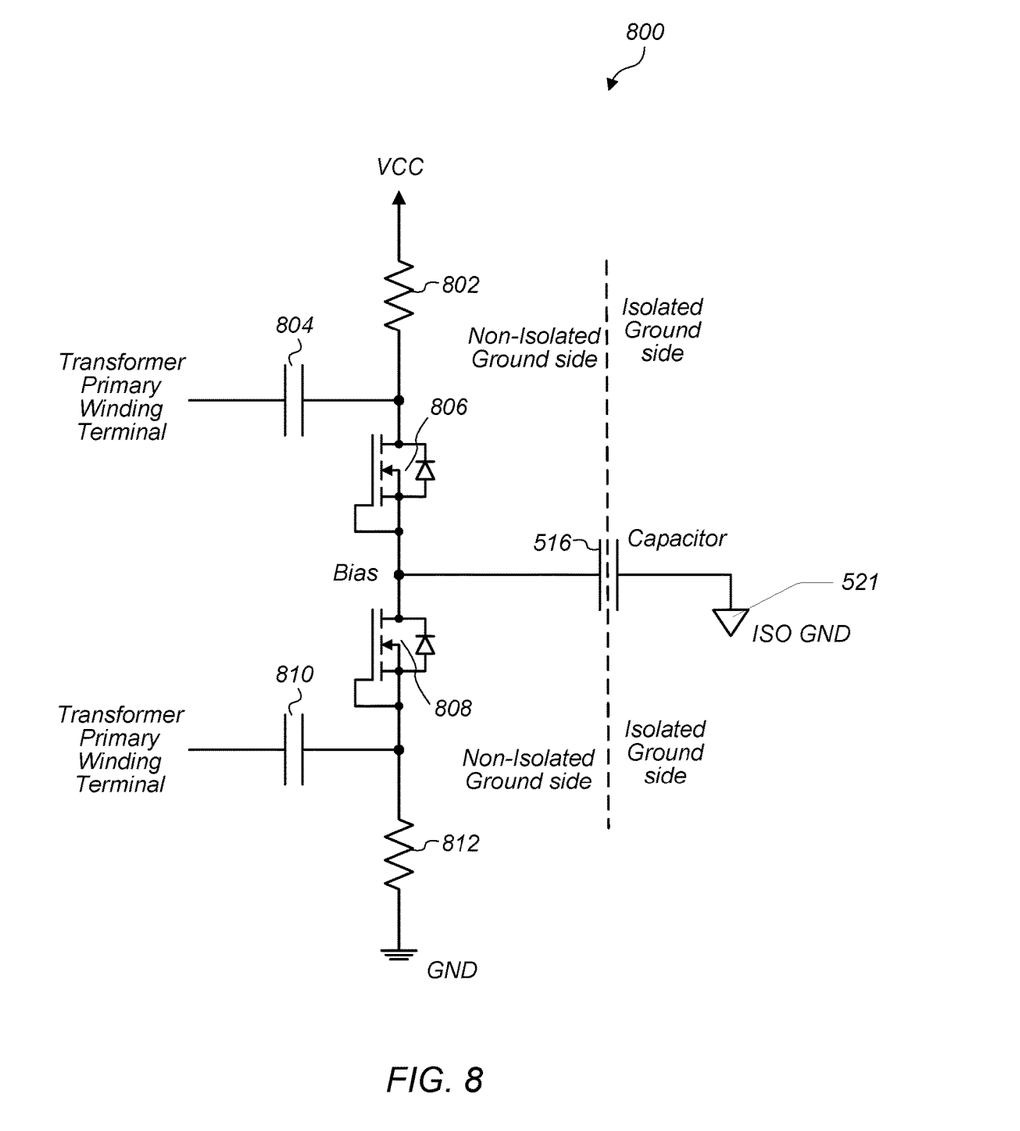
FIG. 8 is a circuit diagram of an exemplary implementation of the variable capacitor network using MOSFET body diodes, according to some embodiments.

FIG. 8 is a circuit diagram of an exemplary implementation 800 of the variable capacitor network using MOSFET body diodes, according to some embodiments. As shown in FIG. 8, in some embodiments, variable capacitor network 508 may be implemented using MOSFET (metal-oxide semiconductor field effect transistor) diodes 806 and 808 configured with static capacitors 804 and 810, and resistors 802 and 812. Capacitors 804 and 810 may be used to respectively couple to the two primary legs of the transformer (e.g. transformer 150 in FIG. 6), to be driven by the same drive signals as transformer 150. Again, the implementation 800 of variable capacitor network 508 may be considered a variable capacitor diode network.

The diode junctions of the variable capacitor diode network, in both the implementation of FIG. 7 and the implementation of FIG. 8, may be reverse biased, e.g. by DAC 506, at the indicated "Bias" node. The junction capacitance of each diode—i.e. diode 706 and diode 712 in 700, and diode 806 and diode 808 in 800—is inversely proportional to the magnitude of the reverse bias. When the variable capacitor diode network is coupled to isolated ground 521 via capacitor 516, the bias voltage of the variable capacitor diode network changes the amplitude and polarity of the compensation current injected into isolated ground 521 through capacitor 516. For example, for a bias voltage of 0.5*Vcc, the compensation current is zero.

Common-mode current-compensation circuits designed around trim resistors, such as the one exemplified in FIG. 1, for example, are bandwidth limited by the trim resistor. Higher compensation bandwidth improves the effectiveness of the compensation circuit. Higher compensation bandwidth can be achieved by a lower resistance trimmer at the cost of higher quiescent current. Replacing the trim resistor with a trim capacitor removes the bandwidth limitations of the compensation circuit, which increases the effectiveness of the compensation circuit.

It should be noted that specific circuit components described with reference to FIG. 6 are meant to be exemplary only, and are not intended to limit the invention to any specific set of components or configurations. For example, in various embodiments, one or more of the components described may be omitted, combined, modified, or additional components included, as desired.

Figure 4:
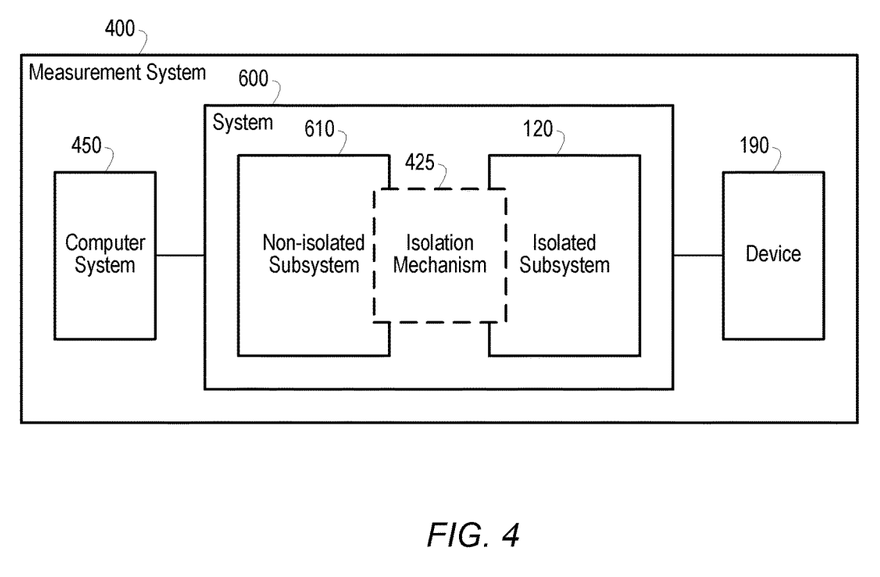
FIG. 4 is a block diagram of one embodiment of an instrumentation system, according to some embodiments.

FIG. 4 is a block diagram of one embodiment of an instrumentation system 400 including the system 600 of FIG. 6. In the depicted embodiment of FIG. 4, the instrumentation system 400 includes a computer system 450, system 600, and device 190. System 400 may be a card or board (e.g., an instrumentation device) configured to be plugged into one of the I/O slots of computer system 450. Non-isolated subsystem 610 may be the digital back-end of system 400, which may interface with computer system 450. Isolated subsystem 120 may be the system front-end including an analog input or an analog output channel, which may connect to a customer's device, e.g., device 190. Isolated subsystem 120 may include analog-to-digital converters, digital-to-analog converters, and/or conditioning circuitry to process the signals. Isolation mechanism 425 (e.g., transformer 150 of FIG. 6) may provide isolation between non-isolated subsystem 610 and isolated subsystem 120 by blocking DC signals. In some embodiment, isolation mechanism 425 may also provide the power necessary to operate isolated subsystem 120.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a first subsystem configured to generate a compensation signal, wherein the first subsystem comprises:
      a driver circuit configured to generate drive signals for an isolation mechanism, and provide the drive signals to the isolation mechanism; and
      a compensation circuit configured to receive the drive signals and generate the compensation signal according to at least the drive signals; and
   an isolated subsystem coupled to the first subsystem via the isolation mechanism, wherein the isolation mechanism is configured to block DC signals from being received at the isolated subsystem, wherein the isolated subsystem is configured to receive a common-mode current from the first subsystem via the isolation mechanism;
   wherein the compensation circuit is configured to provide the compensation signal to a ground plane of the isolated subsystem to reduce or eliminate the common-mode current received at the isolated subsystem.

2. The system of claim 1, wherein the driver circuit comprises:
   a first switching mechanism coupled to the isolation mechanism; and
   a second switching mechanism coupled to the isolation mechanism, wherein the first switching mechanism and the second switching mechanism are configured to control the drive signals.

3. The system of claim 2, wherein the driver circuit further comprises:
   a pulse generation unit configured to generate a first switching signal for changing a state of the first switching mechanism and a second switching signal for changing a state of the second switching mechanism.

4. The system of claim 1, wherein the isolation mechanism is a transformer.

5. The system of claim 1, wherein the compensation circuit comprises a capacitor circuit which comprises at least one of the following:
   a variable capacitor diode network configured to receive the drive signals; or
   a variable capacitor network configured to receive the drive signals.

6. The system of claim 5, wherein the compensation circuit further comprises a biasing element configured to provide a direct-current (DC) bias voltage to the capacitor network, wherein the compensation circuit is configured to generate the compensation signal further according to the DC bias voltage.

7. The system of claim 6, wherein the biasing element is a digital-to-analog converter.

8. The system of claim 6, wherein the compensation circuit is configured to adjust an amplitude and polarity of the compensation signal according to the DC bias voltage.

9. The system of claim 5, wherein the variable capacitor diode network comprises one of:
   variable capacitance diodes; or
   metal-oxide semiconductor field effect transistor body diodes.

10. An isolated power supply comprising:
    a transformer comprising:
        a primary winding configured to receive an input voltage; and
        a secondary winding configured to provide an output voltage based on the input voltage;
    a driver circuit configured to provide drive signals to the primary winding of the transformer to control the output voltage; and
    a compensation circuit configured to:
        receive the drive signals from the driver circuit;
        generate a compensation signal according to at least the received drive signals; and
        provide the compensation signal to a ground plane coupled to the secondary winding of the transformer to reduce or eliminate a residual current in the secondary winding.

11. The isolated power supply of claim 10, wherein the residual current is caused by a parasitic capacitance mismatch between the primary winding of the transformer and the secondary winding of the transformer.

12. The isolated power supply of claim 10, wherein the compensation circuit comprises a capacitor circuit which comprises at least one of the following:
    a variable capacitor diode network configured to receive the drive signals; or
    a variable capacitor network configured to receive the drive signals.

13. The isolated power supply of claim 12, wherein the compensation circuit further comprises a biasing element configured to provide a bias voltage to the capacitor circuit, wherein the compensation circuit is configured to generate the compensation signal further according to the bias voltage.

14. The isolated power supply of claim 13, wherein the compensation circuit is configured to adjust an amplitude and polarity of the compensation signal according to the bias voltage.

15. The isolated power supply of claim 12, wherein the variable capacitor diode network comprises one or more of the following:
    variable capacitance diodes; or
    metal-oxide semiconductor field effect transistor body diodes.

16. The isolated power supply of claim 12, wherein the compensation circuit is configured to provide the compensation signal to the ground plane through a capacitor that couples the variable capacitor diode network to the ground plane.

17. An instrumentation system comprising:
    a computer system including one or more input/output (I/O) slots, each for receiving an instrumentation device; and
    an instrumentation device coupled to one of the I/O slots of the computer system, wherein the instrumentation device includes:
        a first subsystem configured to generate a compensation signal, wherein the first subsystem includes:
            a driver circuit configured to generate drive signals for an isolation mechanism, and provide the drive signals to the isolation mechanism; and
            a compensation circuit configured to receive the drive signals and generate the compensation signal according to at least the drive signals; and
        an isolated subsystem coupled to the first subsystem via the isolation mechanism, wherein the isolation mechanism is configured to block DC signals from being received at the isolated subsystem;
    wherein the compensation circuit is configured to provide the compensation signal to a ground plane of the isolated subsystem to reduce or eliminate a residual current present in the isolated subsystem.

18. The instrumentation system of claim 17, wherein the isolation mechanism is a transformer.

19. The instrumentation system of claim 18, wherein the compensation circuit comprises:
    a capacitor circuit configured to receive the drive signals;
    a biasing element configured to provide a bias voltage to the capacitor network; and
    a capacitor coupling the capacitor circuit to the ground plane of the isolated subsystem;
    wherein the compensation circuit is configured to adjust an amplitude and polarity of the compensation signal according to the bias voltage, and provide the compensation signal to the ground plane through the capacitor;
    wherein the capacitor circuit comprises at least one of the following:
        a variable capacitor diode network configured to receive the drive signals; or
        a variable capacitor network configured to receive the drive signals.

20. The instrumentation system of claim 19, wherein the variable capacitor diode network comprises one or more of the following:
    variable capacitance diodes; or
    metal-oxide semiconductor field effect transistor body diodes.

* * * * *